(12) United States Patent
Komatsu et al.

(10) Patent No.: US 11,597,103 B2
(45) Date of Patent: Mar. 7, 2023

(54) ROBOT ARM HAVING A RECESSED PORTION WITH A DRAIN

(71) Applicant: Seiko Epson Corporation, Tokyo (JP)

(72) Inventors: Daisuke Komatsu, Suwa (JP); Toshio Tanaka, Azumino (JP); Kotaro Sekine, Azumino (JP)

(73) Assignee: SEIKO EPSON CORPORATION

( * ) Notice: Subject to any disclaimer, the term of this patent is extended or adjusted under 35 U.S.C. 154(b) by 199 days.

(21) Appl. No.: 16/831,942

(22) Filed: Mar. 27, 2020

(65) Prior Publication Data
US 2020/0307001 A1    Oct. 1, 2020

(30) Foreign Application Priority Data
Mar. 28, 2019  (JP) .............................. JP2019-062989

(51) Int. Cl.
*B25J 19/00*   (2006.01)
*B25J 18/00*   (2006.01)
*B25J 9/00*    (2006.01)

(52) U.S. Cl.
CPC ......... *B25J 19/0075* (2013.01); *B25J 9/0015* (2013.01); *B25J 18/00* (2013.01); *B25J 19/0029* (2013.01)

(58) Field of Classification Search
CPC .. B25J 19/0075; B25J 19/0029; B25J 9/0015; B25J 18/00
See application file for complete search history.

(56) References Cited

U.S. PATENT DOCUMENTS

| 5,220,849 | A  | * | 6/1993 | Lande ..................... | B25J 9/042 901/22 |
| 6,207,231 | B1 | * | 3/2001 | Tateyama ................. | B05D 3/10 118/321 |
| 6,248,169 | B1 | * | 6/2001 | Juang ..................... | B05B 14/00 118/52 |
| 10,456,908 | B2 | * | 10/2019 | Bordegnoni ............. | B25J 9/044 |
| 2002/0025375 | A1 | * | 2/2002 | Takamori ............ | H01L 21/6838 427/240 |
| 2011/0303042 | A1 |  | 12/2011 | Pan et al. | |
| 2015/0367505 | A1 | * | 12/2015 | Ruiz Garcia .......... | B25J 9/0051 134/167 C |
| 2016/0184986 | A1 | * | 6/2016 | Procyshyn ............... | B25J 18/04 74/490.01 |
| 2016/0297081 | A1 |  | 10/2016 | Watanabe et al. | |
| 2017/0239810 | A1 |  | 8/2017 | Bordegnoni et al. | |
| 2019/0152074 | A1 | * | 5/2019 | Xiong ................... | B32B 27/304 |
| 2019/0307061 | A1 | * | 10/2019 | Hong .................... | A01D 34/78 |
| 2021/0178614 | A1 | * | 6/2021 | Murakami .......... | B25J 19/0075 |

FOREIGN PATENT DOCUMENTS

| CN | 107097208 A | 8/2017 |
| JP | H09-234688 A | 9/1997 |
| JP | 2007-237315 A | 9/2007 |
| JP | 2016-198849 A | 12/2016 |

* cited by examiner

*Primary Examiner* — William C Joyce
*Assistant Examiner* — Gregory T Prather
(74) *Attorney, Agent, or Firm* — Harness, Dickey & Pierce, P.L.C.

(57) ABSTRACT

A robot includes a movable unit displaced in horizontal directions and having a recessed part opening upward in a vertical direction, a connector placed within the recessed part, and a drain part that communicates between a bottom portion of the recessed part and an outside of the movable unit and drains a liquid within the recessed part out of the recessed part.

6 Claims, 6 Drawing Sheets

ROBOT ARM HAVING A RECESSED PORTION WITH A DRAIN

The present application is based on, and claims priority from JP Application Serial Number 2019-062989, filed Mar. 28, 2019, the disclosure of which is hereby incorporated by reference herein in its entirety.

BACKGROUND

1. Technical Field

The present disclosure relates to a robot.

2. Related Art

JP-A-2016-198849 discloses a robot in which a recessed part is provided in a housing of a robot arm and connectors etc. are placed within the recessed part. Further, in the housing of the robot arm, a cover that covers the recessed part is placed and a drain hole is formed in the cover. When a liquid such as water injected from a sprinkler is collected in the recessed part, the robot drains the liquid within the recessed part via the drain hole with the recessed part downward in a vertical direction.

However, in a case where the robot is a scalar robot having only an arm that moves in horizontal directions, it is impossible to set the recessed part downward in the vertical direction and it is hard to drain the liquid collected in the recessed part.

SUMMARY

A robot according to the present disclosure includes a movable unit displaced in horizontal directions and having a recessed part opening upward in a vertical direction, a connector placed within the recessed part, and a drain part that communicates between a bottom portion of the recessed part and an outside of the movable unit and drains a liquid within the recessed part out of the recessed part.

DESCRIPTION OF EXEMPLARY EMBODIMENTS

As below, a robot according to the present disclosure will be explained in detail based on embodiments shown in the accompanying drawings.

First Embodiment

Figure 1:
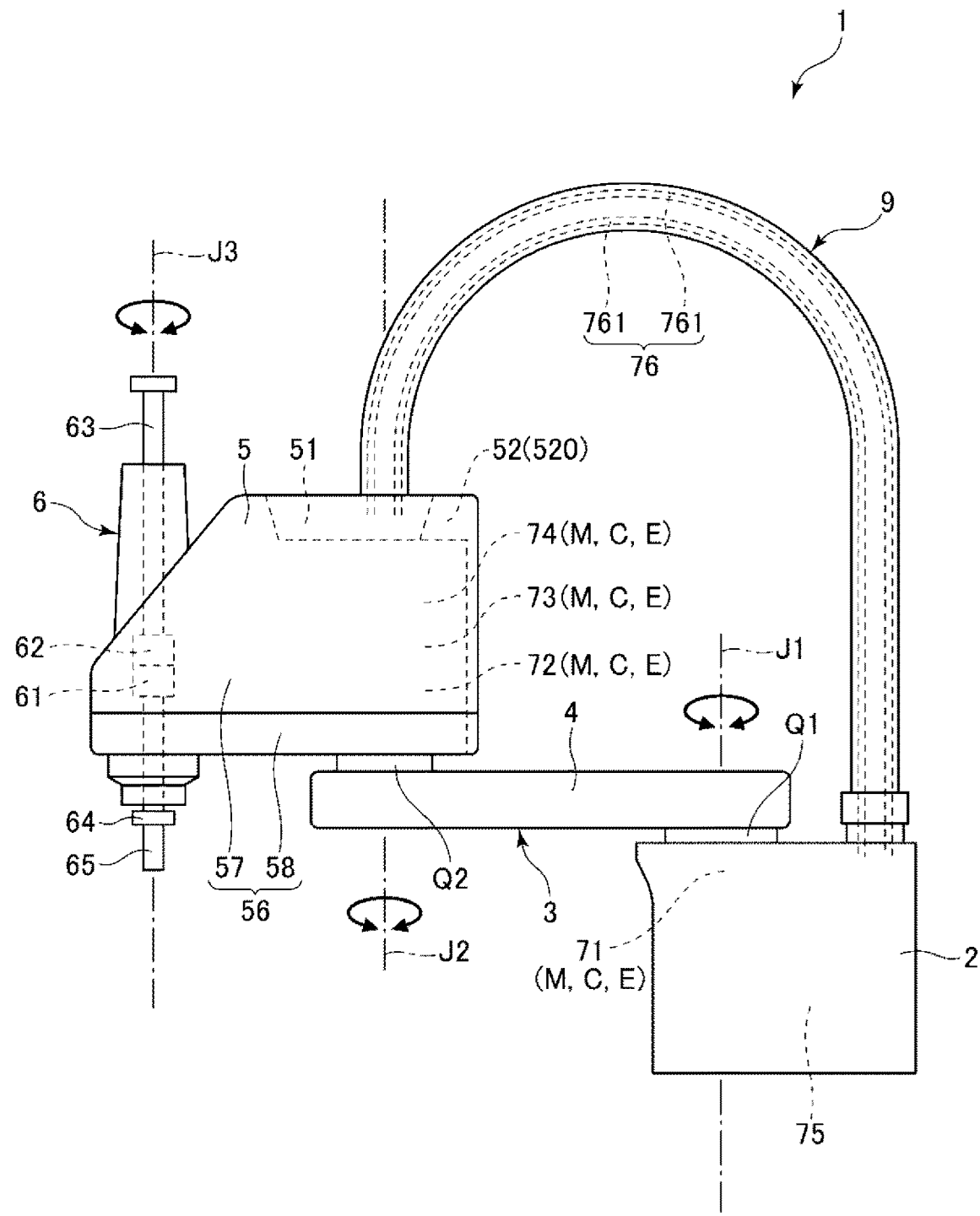
FIG. 1 is a side view showing a robot according to a first embodiment of the present disclosure.
Figure 2:
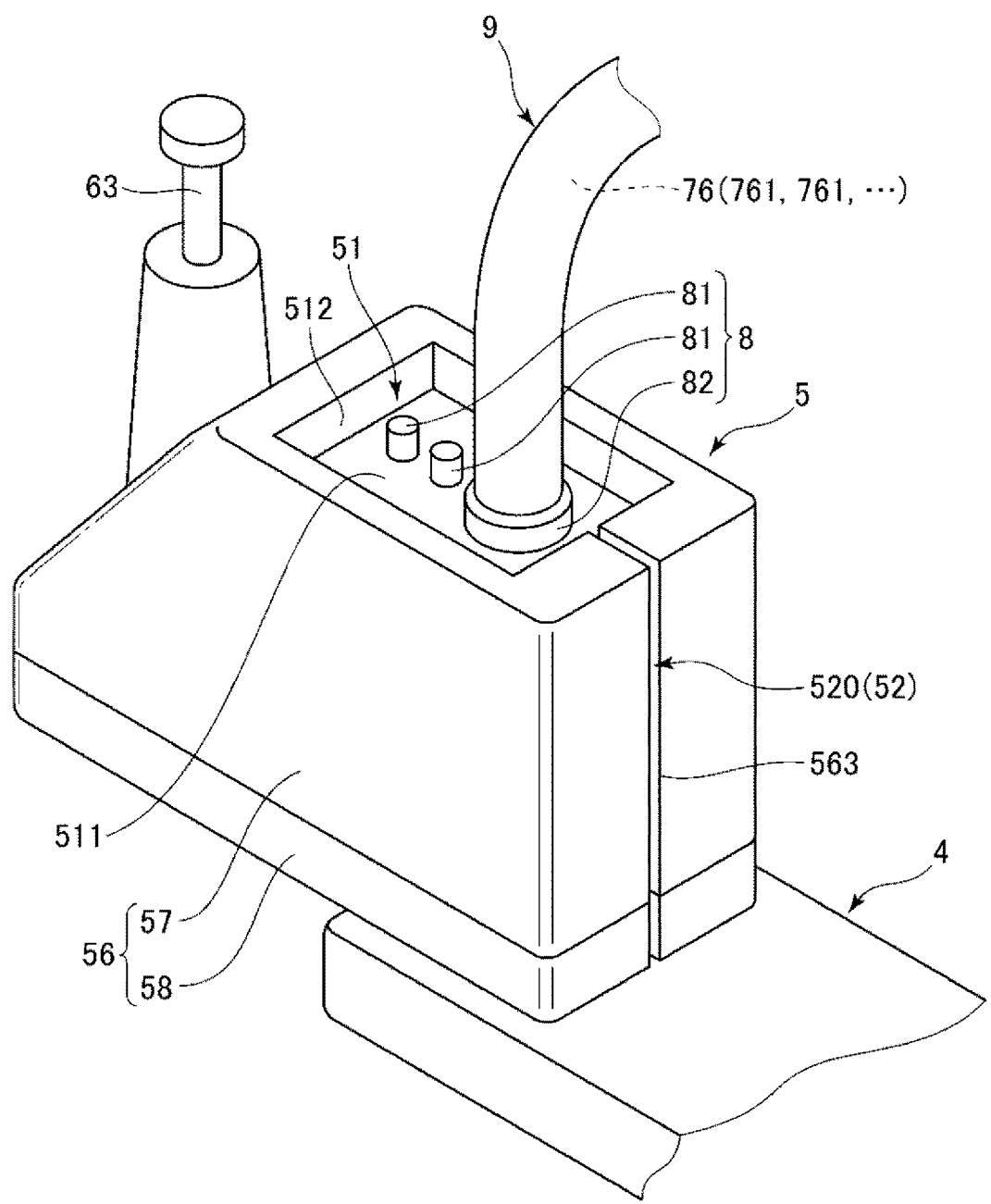
FIG. 2 is a perspective view showing a second arm of the robot in FIG. 1.
Figure 3:
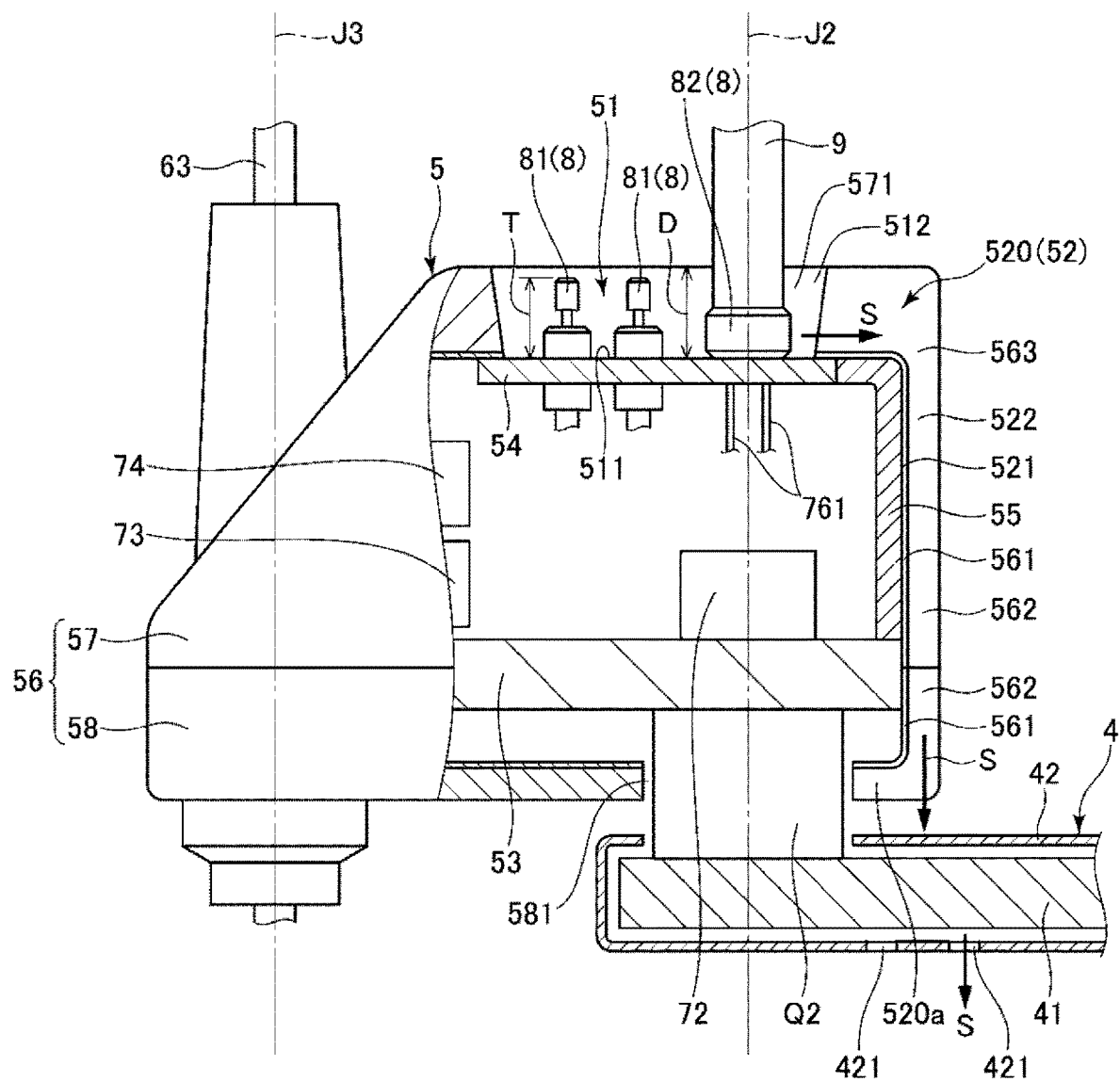
FIG. 3 is a sectional view of the second arm.
Figure 4:
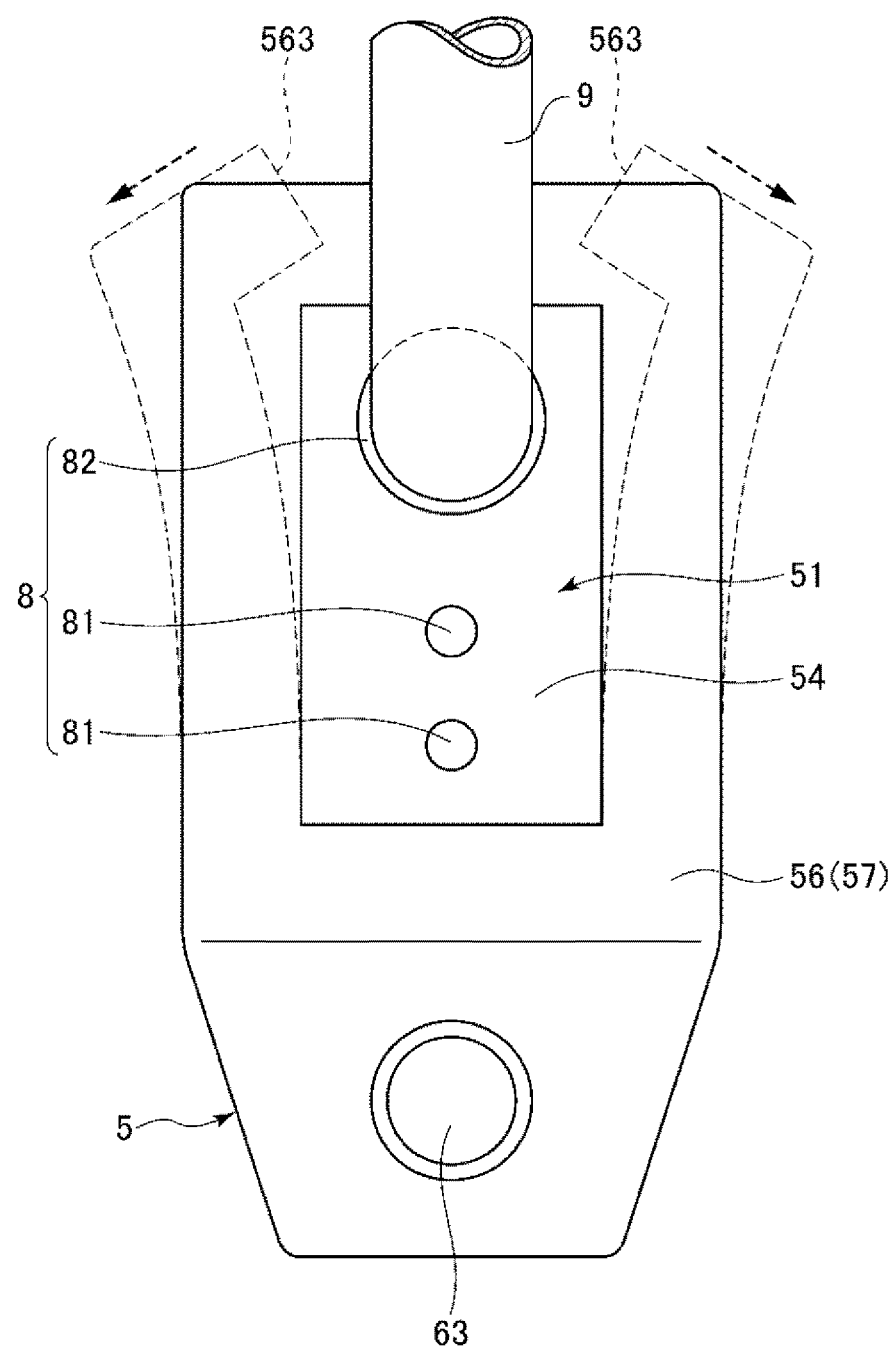
FIG. 4 is a top view of the second arm.

FIG. 1 is the side view showing the robot according to the first embodiment of the present disclosure. FIG. 2 is the perspective view showing the second arm of the robot in FIG. 1. FIG. 3 is the sectional view of the second arm. FIG. 4 is the top view of the second arm.

Note that upward and downward directions in FIG. 1 coincide with vertical directions, and the upside in FIG. 1 is also referred to as "upper" and the downside is also referred to as "lower". Further, in this specification, "horizontal" is not limited to a case that coincides with horizontal, but includes cases with inclinations relative to horizontal within a range in which effects of the present disclosure may be exerted. Similarly, in this specification, "vertical" is not limited to a case that coincides with vertical, but includes cases with inclinations relative to vertical within a range in which the effects of the present disclosure may be exerted. Furthermore, in this specification, "parallel" is not limited to a case where two objects coincide with parallel, but includes cases with inclinations relative to parallel within a range in which the effects of the present disclosure may be exerted.

The robot 1 shown in FIG. 1 is a horizontal articulated robot (scalar robot) and used for respective work including e.g. hold, transport, assembly, test of works of electronic components etc. The application of the robot 1 is not particularly limited.

The robot 1 has a base 2, an arm 3 coupled to the base 2, and a pipe 9 coupling the base 2 and the arm 3. Further, the arm 3 has a first arm 4 pivotable about a first axis J1 relative to the base 2 with the proximal end portion coupled to the base 2, and a second arm 5 pivotable about a second axis J2 parallel to the first axis J1 relative to the first arm 4 with the proximal end portion coupled to the distal end portion of the first arm 4. Furthermore, a working head 6 is provided in the distal end portion of the second arm 5.

The base 2 is fixed to e.g. a floor surface (not shown) by bolts or the like. A drive device 71 that pivots the first arm 4 about the first axis J1 relative to the base 2 is provided within the base 2, and a drive device 72 that pivots the second arm 5 about the second axis J2 relative to the first arm 4 is provided within the second arm 5. The drive devices 71 and 72 respectively include motors M as drive sources, controllers C that control driving of the motors M, encoders E that detect amounts of rotation of the motors M, etc.

The working head 6 has a spline nut 61 and a ball screw nut 62 coaxially placed in the distal end portion of the second arm 5, and a spline shaft 63 inserted through the spline nut 61 and the ball screw nut 62. The spline shaft 63 is rotatable about a third axis J3 as a center axis thereof relative to the second arm 5 and movable upward and downward in directions along the third axis J3. Note that the third axis J3 is parallel to the first axis J1 and the second axis J2 and extends along the vertical directions.

A drive device 73 that rotates the spline nut 61 to rotate the spline shaft 63 about the third axis J3 and a drive device 74 that rotates the ball screw nut 62 to move the spline shaft 63 upward and downward in the directions along the third axis J3 are provided within the second arm 5. The drive devices 73 and 74 respectively include motors M as drive sources, controllers C that control driving of the motors M, encoders E that detect amounts of rotation of the motors M, etc.

A payload 64 for attachment of an end effector 65 is provided in the lower end portion of the spline shaft 63. The end effector 65 attached to the payload 64 is not particularly limited to, but includes e.g. a hand that holds an object and a work tool for processing an object.

Within the base 2, a robot control apparatus 75 that controls driving of the drive devices 71, 72, 73, and 74 based on commands from a host computer (not shown) is provided. A group of wires 76 having a plurality of wires 761 electrically coupling the robot control apparatus 75 and the drive devices 72, 73, and 74 are routed from the base 2 through the pipe 9 to the second arm 5. Thereby, the group of wires 76 do not necessarily pass a joint Q1 coupling the base 2 and the first arm 4 or a joint Q2 coupling the first arm 4 and the second arm 5 and are easily routed.

The robot control apparatus 75 includes e.g. a computer, and has a processor (CPU) that processes information, a memory communicably connected to the processor, and an external interface. Various programs that can be executed by the processor are saved in the memory, and the processor may read and execute the various programs etc. stored in the memory.

As above, the entire configuration of the robot 1 is briefly explained. Note that the configuration of the robot 1 is not particularly limited, but, for example, the arm 3 may be configured so that the second arm 5 is coupled to the base 2 without the first arm 4, and at least another arm pivotable about an axis extending in the vertical direction may intervene between the first arm 4 and the second arm 5.

Next, the second arm 5 will be explained in detail. As shown in FIG. 2, the second arm 5 has a recessed part 51 opening upward in the vertical direction. Within the recessed part 51, a plurality of connectors 81 and a pipe connector 82 to which the pipe 9 is coupled are provided. The plurality of connectors 81 and the pipe connector 82 are respectively attached to a bottom portion 511 of the recessed part 51.

The respective connectors 81 are not particularly limited to, but include e.g. a power connector for end effector, a connector for supplying compressed air used in the end effector, a connector for camera attached to the second arm or the end effector, a connector for LAN connection, connectors for various sensors such as an acceleration sensor, angular velocity sensor, force sensor, proximity sensor, and temperature sensor. The numbers of the connectors 81 and the pipe connector 82 are not particularly limited, but may be appropriately set according to the specifications of the robot 1. Hereinafter, for convenience of explanation, the connectors 81 and the pipe connector 82 may be collectively referred to as "group of connectors 8".

As described above, the group of connectors 8 are provided within the recessed part 51, and thereby, the group of connectors 8 are surrounded by the second arm 5 and exposure of the group of connectors 8 out of the second arm 5, i.e., to the outside of the contour of the second arm 5 is suppressed. Accordingly, direct contact of the connectors 81 or pipe connector 82 of the group of connectors 8 with an object or human around the robot 1 may be suppressed. The connectors 81 and the pipe connector 82 are formed using a harder material such as a metal and generally have shapes with many corners. The direct contact of the group of connectors 8 with an object or human is suppressed, and thereby, the safer robot 1 is obtained. Further, damage on the group of connectors 8 may be suppressed. Particularly, in the embodiment, as shown in FIG. 3, a depth D of the recessed part 51 is larger than a maximum height T of the group of connectors 8 and the whole group of connectors 8 are housed within the recessed part 51. Accordingly, the above described effect may be exerted more remarkably.

The second arm 5 has a drain part 52 communicating between the bottom portion 511 of the recessed part 51 and the outside of the second arm 5 and draining a liquid S of the recessed part 51 out of the recessed part 51. Here, the outside of the second arm 5 refers to the outside of the contour of the second arm 5. For example, depending on the usage environment of the robot 1, a sprinkler may be placed around and water injected from the sprinkler may be collected in the recessed part 51. Or, in a case where a liquid (including oil) is used for the work by the robot 1 or the liquid is transported, the liquid may be collected in the recessed part 51. As described above, when the liquid S is collected in the recessed part 51, the group of connectors 8 may be corroded and deteriorated, the connectors may be short-circuited, or the liquid S may enter the second arm 5. Accordingly, the drain part 52 is provided and the liquid S within the recessed part 51 is drained via the drain part 52, and thereby, the probability that the above described problems occur is sufficiently lower. Therefore, the robot 1 with higher reliability is obtained.

As shown in FIGS. 2 and 3, the drain part 52 includes a groove 520 with one end portion coupled to the bottom portion 511 of the recessed part 51. Thereby, the configuration of the drain part 52 is simpler. Further, as shown in FIG. 3, a bottom portion 521 of the groove 520 is flush with the bottom portion 511 of the recessed part 51. Thereby, the liquid S within the recessed part 51 may be drained to the groove 520 more smoothly. Note that the configuration is not limited to that, but, for example, the bottom portion 521 of the groove 520 may be located below the bottom portion 511 of the recessed part 51 in the vertical direction and a step or inclined surface may be formed between the portions.

The groove 520 is located closer to the proximal end side of the second arm 5 than the recessed part 51. More specifically, the groove 520 extends from the recessed part 51 through the upper surface of the second arm 5 and a side surface, i.e., a back surface at the proximal side of the second arm 5 to a lower end portion of the back surface. Further, the groove 520 has a portion overlapping with a plane passing through the second axis J2 and the third axis J3. As described above, the groove 520 is provided in the proximal end portion of the second arm 5, and thereby, placement of the drain part 52 is easier and the drain part 52 is harder to lie in the way of the placement of the other components. Note that the placement of the drain part 52 is not particularly limited, but the part may be located in the distal end portion of the second arm 5 or located in a side portion of the second arm 5.

An end portion 520a at the downstream of the groove 520 overlaps with the distal end portion of the first arm 4 in a plan view from the vertical direction, and the liquid S drained from within the recessed part 51 through the groove 520 runs to the first arm 4. That is, the liquid S runs down onto the upper surface of the first arm 4. Then, as shown by an arrow in FIG. 3, the liquid S falls from the first arm 4 toward the floor surface. The first arm 4 is located closer to the proximal end side than the second arm 5 and has a movable range smaller than a movable range of the second arm 5. Therefore, the liquid S drained from the recessed part 51 falls from the first arm 4 to the floor surface, and thereby, compared to the case where the liquid falls from the second arm 5 directly to the floor surface, the range in which the liquid S is scattered on the floor surface may be made smaller. Accordingly, cleaning, i.e., collection of the liquid S scattered on the floor surface is easier. Note that, in the embodiment, the liquid S drained from the recessed part 51 runs to the first arm 4 in the entire range of the pivot angle of the second arm 5. Note that the configuration is not limited to that, but the liquid S drained from the recessed part 51 may fall from the second arm 5 directly onto the floor surface.

As shown in FIG. 3, the first arm 4 has an arm base 41 coupled to the base 2 and an exterior member 42 covering the arm base 41. In the bottom portion of the exterior member 42, a drain hole 421 for draining the liquid S running from the second arm 5, running down from the second arm 5, entering the first arm 4 from a gap between the arm base 41 and the exterior member 42 out of the first arm 4 is provided. Thereby, the liquid S running from the second arm 5 may be drained out of the first arm 4 more reliably. Note that various conditions including the position, number, and shape of the drain hole 421 are not particularly limited. For example, when the first arm 4 has the arm base 41 and the exterior member 42 covering the upper surface and the side surface of the arm base 41 and the lower surface side of the arm base 41 is exposed, the drain hole 421 may be provided in the bottom portion of the arm base 41 of the first arm 4. Or, the drain hole 421 may be omitted. Note that the drain route of the liquid S is not limited to those.

Returning to the explanation of the second arm 5, as shown in FIG. 3, the second arm 5 has an arm base 53 coupled to the first arm 4, a bottom portion forming member 54 forming the bottom portion 511 of the recessed part 51, a coupling member 55 located in the proximal end portion of the second arm 5 and coupling the arm base 53 and the bottom portion forming member 54, and an exterior member 56 covering these respective parts and forming a side wall portion of the recessed part 51. The coupling member 55 has a belt-like shape, and the proximal end portion thereof is coupled to the arm base 53 and the distal end portion is coupled to the bottom portion forming member 54.

Of the members, the arm base 53, the bottom portion forming member 54, and the coupling member 55 are formed using sufficiently hard materials including e.g. metal materials and resin materials. On the other hand, the exterior member 56 is formed using a sufficiently soft material. According to the configuration, the rigidity of the second arm 5 may be sufficiently secured and the outer surface of the second arm 5 may be made softer. Accordingly, even when the second arm 5 collides with an object or human around, the impact is relaxed by the exterior member 56, and the safer robot 1 is obtained.

The exterior member 56 is divided into an upper member 57 located at the upside of the arm base 53 and a lower member 58 located at the downside of the arm base 53. The exterior member 56 is divided into the upper member 57 and the lower member 58, and thereby, attachment of the exterior member 56 to the arm base 53 is easier. Note that the configuration of the exterior member 56 is not limited to that, but may not be divided into the upper member 57 and the lower member 58 or may be divided into more members.

Further, the exterior member 56 has a base portion 561 and an exterior portion 562 provided on the outer surface of the base portion 561, and the outer surface of the exterior portion 562 forms the outer surface of the exterior member 56. The elastic modulus of the exterior portion 562 is smaller than the elastic modulus of the bottom portion forming member 54. Accordingly, the surface of the second arm 5 is sufficiently soft and the impact at collision may be effectively relaxed. Therefore, the safe robot 1 is obtained.

The base portion 561 may be formed using e.g. polyethylene, polypropylene, ABS resin, or the like. The exterior portion 562 is not particularly limited, but, in the embodiment, formed using foam. Accordingly, the exterior portion 562 may exert higher elasticity and cushioning properties, and the impact at collision may be relaxed more effectively. Therefore, the safer robot 1 is obtained. The constituent material of the foam is not particularly limited, but e.g. polyolefin such as polyethylene or polypropylene, polyurethane, polystyrene, phenol resin, polyvinyl chloride, urea resin, silicone, polyimide, melamine resin, or the like may be used.

Note that the exterior portion 562 is not limited to foam, but e.g. various elastic bodies may be used. The constituent material of the elastic body includes e.g. various rubber materials such as natural rubber, isoprene rubber, butadiene rubber, styrene-butadiene rubber, nitrile rubber, butyl rubber, acrylic rubber, ethylene-propylene rubber, urethan rubber, and silicone rubber and various elastomers of styrene series, polyolefin series, polyvinyl chloride series, polyurethane series, polyester series, polyamide series, polybutadiene series, trans-polyisoprene series, fluorine-rubber series, and chlorinated polyethylene series. One, two, or more kinds of the materials may be mixed for use.

In the embodiment, the whole exterior portion 562 has the smaller elastic modulus than the bottom portion forming member 54, however, the configuration is not limited thereto, and a part of the exterior portion 562 may have the smaller elastic modulus than the bottom portion forming member 54. Or, the whole exterior portion 562 has the larger elastic modulus than the bottom portion forming member 54.

The groove 520 provided in the second arm 5 is formed by the coupling member 55 and the exterior member 56. Specifically, the exterior member 56 is in liquid-tight contact with the coupling member 55. A slit 563 overlapping with the coupling member 55 and extending along the coupling member 55 is formed in the proximal end portion of the exterior member 56. The slit 563 forms a side wall portion 522 of the groove 520, and a portion of the coupling member 55 exposed from the slit 563 forms the bottom portion 521 of the groove 520. Thereby, the groove 520 may be formed in a simple structure.

The upper member 57 has an opening 571 forming the opening of the recessed part 51 and the side wall portion, and the proximal end side from the opening 571 is divided into a left half and a right half by the slit 563. Accordingly, as shown in FIG. 4, for example, even when the pipe 9 is coupled to the pipe connector 82, the slit 563 is widely opened to right and left for the pipe 9 to pass through the slit 563, and thereby, the upper member 57 may be attached to the arm base 53. Therefore, assembly of the robot 1 is easier. Similarly, the lower member 58 has an opening (not shown) through which the spline shaft 63 is inserted and an opening 581 through which the joint Q2 coupled to the first arm 4 is inserted, and the proximal end side from the opening 581 is divided into a left half and a right half by the slit 563. Accordingly, for example, even when the second arm 5 is coupled to the first arm 4, the slit 563 is widely opened to right and left for the joint Q2 to pass through the slit 563, and thereby, the lower member 58 may be attached to the arm base 53. Therefore, the assembly of the robot 1 is easier.

As above, the robot 1 is explained. As described above, the robot 1 has the arm 3 as a movable unit displaced in horizontal directions and having the recessed part 51 opening upward in the vertical direction, the connectors 81 placed within the recessed part 51, and the drain part 52 communicating between the bottom portion 511 of the recessed part 51 and the outside of the third arm 3 and draining the liquid collected in the recessed part 51 out of the recessed part 51. According to the configuration, the exposure of the connectors 81 out of the arm 3 may be suppressed and the contact of the connectors 81 with an object or human around the robot 1 may be suppressed. Thereby, the safer robot 1 is obtained. Further, damage on the connectors 81 may be suppressed. Furthermore, the liquid collected within the recessed part 51 may be drained out of the recessed part 51 via the drain part 52, and the robot 1 with higher reliability is obtained.

As described above, the arm 3 has the bottom portion forming member 54 forming the bottom portion 511 of the recessed part 51 and the exterior member 56 forming a side wall portion 512 of the recessed part 51, and the elastic modulus of the exterior member 56 is smaller than the elastic modulus of the bottom portion forming member 54. Thereby, the surface of the arm 3 is sufficiently soft and the impact at collision may be effectively relaxed. Therefore, the safe robot 1 is obtained.

Further, as described above, the robot 1 has the base 2 to which the arm 3 is coupled, the pipe 9 coupling the arm 3 and the base 2 and housing the wires 761 inside, and the pipe connector 82 placed within the recessed part 51 and coupled to the pipe 9. Thereby, the exposure of the pipe connector 82 out of the arm 3 may be suppressed and the contact of the pipe connector 82 with an object or human around may be suppressed. As a result, the safer robot 1 is obtained. Further, damage on the pipe connector 82 may be suppressed.

As described above, the arm 3 has the first arm 4 pivoting about the first axis J1 along the vertical direction relative to the base 2 and the second arm 5 pivoting about the second axis J2 along the vertical direction relative to the first arm 4, and the recessed part 51 is provided in the second arm 5. Thereby, electrical coupling to various devices within the second arm 5 is easier via the connectors 81 and the pipe connector 82.

Further, as described above, the spline shaft 63 as the shaft pivoting about the third axis J3 of the second arm 5 is provided, and the groove 520 has the portion overlapping with the plane passing through the second axis J2 and the third axis J3. The first arm 4 has the proximal end portion coupled to the base 2, the second arm 5 has the proximal end portion coupled to the distal end portion of the first arm 4, and the drain part 52 is located in the proximal end portion of the second arm 5. Thereby, the placement of the drain part 52 is easier. As described above, the drain part 52 is the groove 520. Thereby, the configuration of the drain part 52 is simpler.

As described above, the second arm 5 has the arm base 53 coupled to the first arm 4, the bottom portion forming member 54 forming the bottom portion 511 of the recessed part 51, and the coupling member 55 coupling the arm base 53 and the bottom portion forming member 54. The bottom portion 521 of the groove 520 is formed by the coupling member 55 and the side wall portion 522 of the groove 520 is formed by the slit 563 formed in the exterior member 56. Thereby, the formation of the groove 520 is easier.

Further, as described above, the liquid drained from the drain part 52 runs to the first arm 4. Thereby, the liquid drained from the recessed part 51 runs to the first arm 4, and then, falls from the first arm 4 to the floor surface. The movable range of the first arm 4 is smaller than the movable range of the second arm 5, and thus, compared to the case where the liquid falls from the second arm 5 directly to the floor surface, the range in which the liquid is scattered on the floor surface is smaller. Accordingly, cleaning, i.e., collection of the liquid scattered on the floor surface is easier.

As described above, the first arm 4 is located below in the vertical direction relative to the second arm 5, and the first arm 4 has the drain hole 421 for the liquid drained from the drain part 52 to fall. Thereby, the liquid running from the second arm 5 may be drained out of the first arm 4 more reliably.

Second Embodiment

Figure 5:
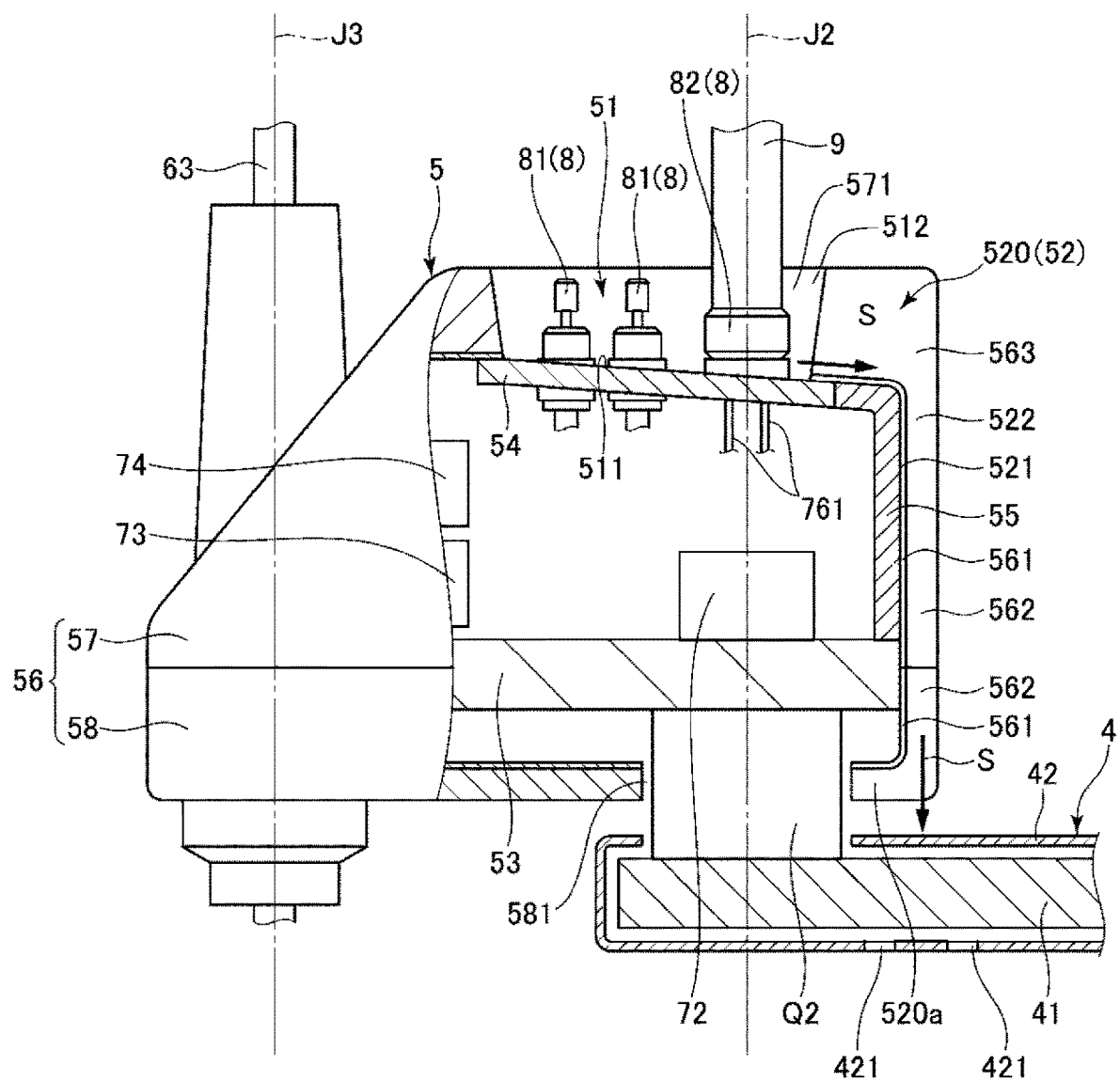
FIG. 5 is a sectional view showing a second arm of a robot according to a second embodiment of the present disclosure.

FIG. 5 is the sectional view showing the second arm of the robot according to the second embodiment of the present disclosure.

The robot 1 according to the embodiment is the same as the above described first embodiment except that the configuration of the recessed part 51 is different. In the following description, the robot 1 of the second embodiment will be explained with a focus on the differences from the above described first embodiment and the explanation of the same items will be omitted. Further, in FIG. 5, the same configurations as those of the above described first embodiment have the same signs.

As shown in FIG. 5, in the recessed part 51 of the embodiment, the bottom portion 511 is inclined downward in the vertical direction toward the drain part 52. Accordingly, the liquid S within the recessed part 51 naturally flows to the drain part 52 side under its own weight and is drained out of the recessed part 51 via the drain part 52. As a result, the liquid is harder to be collected in the recessed part 51, and the robot 1 with higher reliability is obtained.

As described above, in the robot 1 of the embodiment, the bottom portion 511 of the recessed part 51 is inclined downward in the vertical direction toward the drain part 52. Accordingly, the liquid S within the recessed part 51 naturally flows to the drain part 52 side under its own weight and is drained out of the recessed part 51 via the drain part 52. As a result, the liquid is harder to be collected in the recessed part 51, and the robot 1 with higher reliability is obtained.

According to the above described second embodiment, the same effects as those of the above described first embodiment may be exerted.

Third Embodiment

Figure 6:
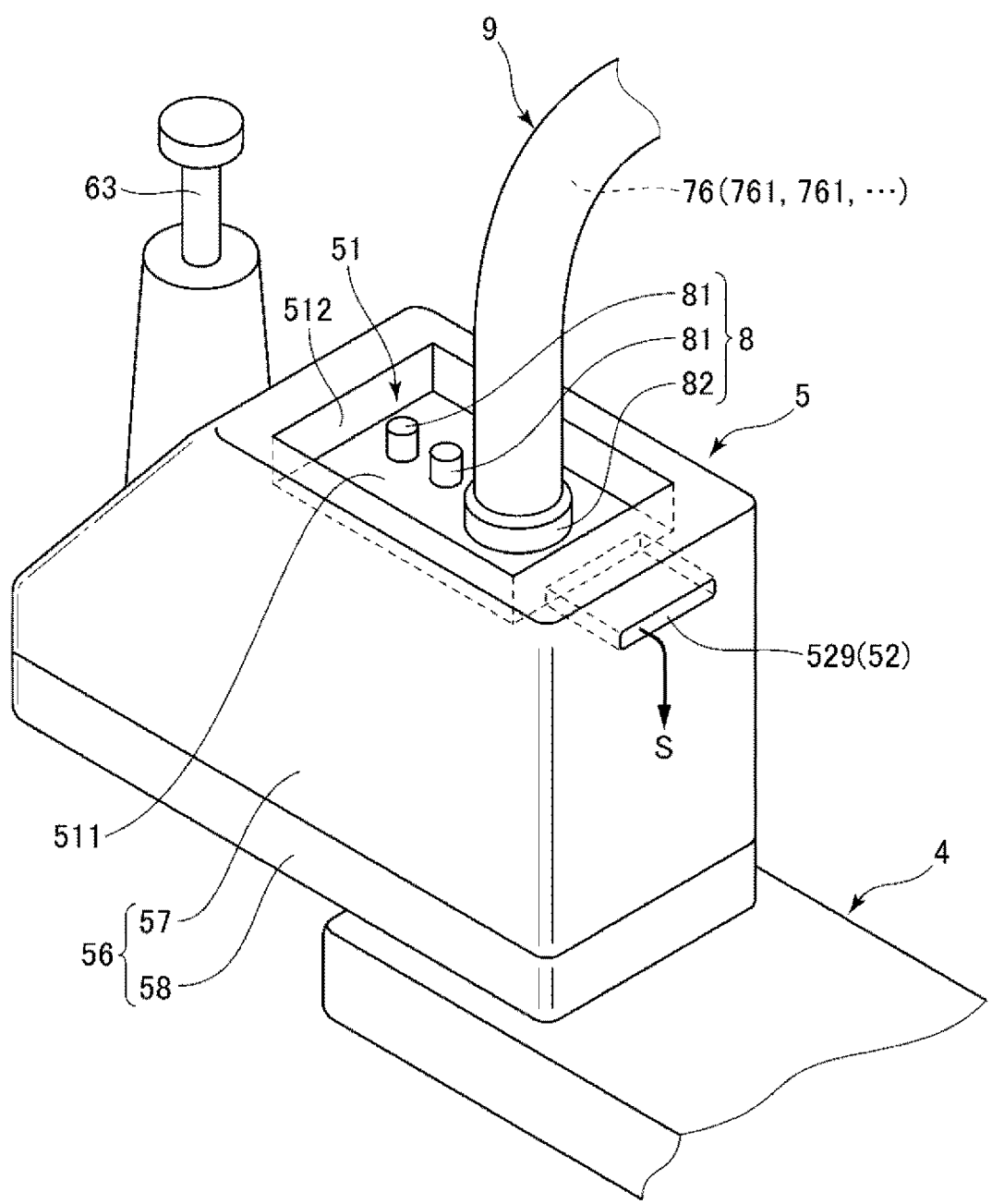
FIG. 6 is a perspective view showing a second arm of a robot according to a third embodiment of the present disclosure.

FIG. 6 is the perspective view showing the second arm of the robot according to the third embodiment of the present disclosure.

The robot 1 according to the embodiment is the same as the above described first embodiment except that the configuration of the drain part 52 is different. In the following description, the robot 1 of the third embodiment will be explained with a focus on the differences from the above described first embodiment and the explanation of the same items will be omitted. Further, in FIG. 6, the same configurations as those of the above described first embodiment have the same signs.

As shown in FIG. 6, the drain part 52 is formed in the exterior member 56 and formed by a through hole 529 that communicates between the interior of the recessed part 51 and the outer surface of the exterior member 56. According to the configuration, the formation of the drain part 52 may be easier.

According to the above described third embodiment, the same effects as those of the above described first embodiment may be exerted.

As above, the robot according to the present disclosure is explained with reference to the illustrated embodiments, however, the present disclosure is not limited to those. The configurations of the respective parts may be replaced by arbitrary configurations having the same functions. Further, another arbitrary configuration may be added thereto. Furthermore, the present disclosure may be a combination of arbitrary two or more configurations of the above described respective embodiments.

What is claimed is:
1. A robot comprising:
  a movable unit displaced in horizontal directions and having a recessed part opening upward in a vertical direction;
  a connector placed within the recessed part;

a drain part that is a groove that communicates between a bottom portion of the recessed part and an outside of the movable unit and drains a liquid within the recessed part out of the recessed part;
a base coupled to the movable unit;
a pipe coupling the movable unit and the base and housing a wire inside; and
a pipe connector placed within the recessed part and coupled to the pipe,
wherein the movable unit has a first arm pivoting about a first axis along the vertical direction relative to the base, and a second arm pivoting about a second axis along the vertical direction relative to the first arm, and
the recessed part is provided in the second arm.

2. The robot according to claim 1, wherein
the bottom portion is inclined downward in the vertical direction toward the drain part.

3. The robot according to claim 1, wherein
the movable unit has a bottom portion forming member forming the bottom portion of the recessed part and an exterior member forming a side wall portion of the recessed part, and
elastic modulus of the exterior member is smaller than elastic modulus of the bottom portion forming member.

4. The robot according to claim 1, further comprising a shaft pivoting about a third axis in the second arm, wherein
the drain part has a portion overlapping with a plane passing through the second axis and the third axis.

5. The robot according to claim 1, wherein
the second arm has an arm base coupled to the first arm, a bottom portion forming member forming the bottom portion of the recessed part, and a coupling member coupling the arm base and the bottom portion forming member,
a bottom portion of the groove is formed by the coupling member, and
a side wall portion of the groove is formed by a slit formed in the exterior member.

6. The robot according to claim 1, wherein the first arm is located vertically below relative to the second arm, and the first arm has a drain hole for the liquid drained from the drain part to fall.

* * * * *